United States Patent [19]

Tsumazawa et al.

[11] Patent Number: 4,862,279

[45] Date of Patent: Aug. 29, 1989

[54] VIDEO CAMERA WITH AUTOMATICALLY MOVABLE MICROPHONE

[75] Inventors: Hiroyuki Tsumazawa; Daigo Yoshioka; Atsushi Kuwada, all of Osaka, Japan

[73] Assignee: Minolta Camera Kabushiki Kaisha, Osaka, Japan

[21] Appl. No.: 254,026

[22] Filed: Oct. 6, 1988

[30] Foreign Application Priority Data

| Oct. 9, 1987 | [JP] | Japan | 62-155009 |
| Nov. 6, 1987 | [JP] | Japan | 62-170526 |
| Nov. 6, 1987 | [JP] | Japan | 62-170527 |
| Nov. 18, 1987 | [JP] | Japan | 62-176060 |

[51] Int. Cl.$^4$ .............................. H04N 5/30
[52] U.S. Cl. ..................... 358/229; 358/209
[58] Field of Search .............. 358/229, 209, 909; 352/27, 29

[56] References Cited

U.S. PATENT DOCUMENTS

| 3,845,238 | 10/1974 | Schneider et al. | 358/229 |
| 3,958,869 | 5/1976 | Beck | 352/35 |
| 4,509,061 | 4/1985 | Nomoto et al. | 358/112 |

Primary Examiner—Jin F. Ng
Assistant Examiner—Stephen Brinich
Attorney, Agent, or Firm—Burns, Doane, Swecker & Mathis

[57] ABSTRACT

A video camera wherein a microphone is shifted from a retracted inoperative position to a projected operative position without fail when the video camera is changed over from a photographing enabled condition to a photographing disabled condition or vice versa. The video camera includes a lens barrier and a microphone which are operatively coupled to each other such that when one of them is moved between its photographing disabling position and its photographing enabling position, the other is also moved between its photographing disabling position and its photographing enabling position. A power supply switch or a video/camera changing over switch may be operatively coupled to the lens barrier and the microphone in a similar relationship. When one of the microphone, lens barrier and switch is manually operated to change over the video camera from a photographing disabled condition to a photographing enabled condition, the others are also moved to the individual photographing enabling positions.

8 Claims, 6 Drawing Sheets

VIDEO CAMERA WITH AUTOMATICALLY MOVABLE MICROPHONE

BACKGROUND OF THE INVENTION

1. Field of the Invention

This invention relates to a still video type and movie type video camera which includes a microphone shifting mechanism.

2. Description of the Prior Art

Generally, a video camera includes a sound recording microphone. Particularly in the case of an integrated video camera having a built-in video deck provided therein or a video camera having a zooming mechanism incorporated therein, a microphone is preferably disposed at a location as far as possible from a body of the camera in order to prevent noises upon actuation of the video deck or the lens from being recorded by way of the microphone. However, where a microphone is fixed at a location spaced from a body of a camera, the compactness of the camera is lost and the camera is inconvenient in putting it into a case or in transportation thereof.

In order to resolve the problem, it has been proposed that a microphone is normally held at a retracted inoperative position in which it is accommodated in or closely contacted with a body of the camera so as to facilitate accommodation or transportation of the camera, but when the microphone is to be used, it is shifted by manual operation of a photographer to a projected operative position in which it is projected and spaced apart from the body of the camera so that noises may not inadvertently be recorded by way of the microphone.

Figure 5:
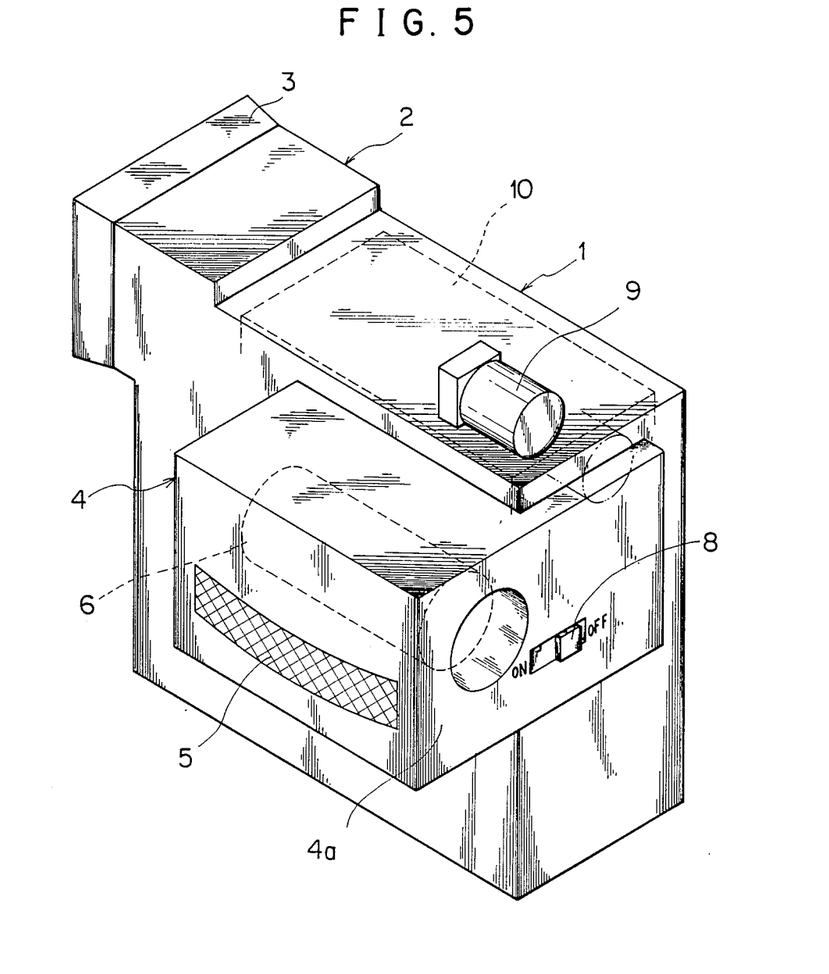
FIG. 5 is a perspective view showing a conventional video camera.

FIG. 5 schematically shows a typical one of conventional video cameras. Referring to FIG. 5, the video camera shown is generally composed of a body section 1, a viewfinder section 2 and a grip section 4. A video deck 10 is disposed in the inside of the body section 1, and a microphone 9 is disposed at the top of the body section 1. An eye cup 3 is mounted on the viewfinder section 2. A lens component 6 is disposed in the inside of the grip section 4, and a hand strap 5 is provided on a side wall of the grip section 4 while a power supply switch 8 is located on a front wall 4a of the grip section 4. The microphone 9 is mounted for shifting movement between a retracted position shown in solid lines in FIG. 5 to which it is held when the video camera is not used for photographing and another projected or advanced position shown in phantom in FIG. 5 to which it is manually pulled out by a photographer when the video camera is to be used for photographing.

In such a conventional video camera as described just above, a switching operation for changing over the camera between a photographing enabled or picture recording enabled condition and a photographing disabled or picture reproduction enabled condition and a shifting operation for shifting a microphone between a retracted inoperative position and a projected or advanced operative position are carried out independently of each other. Thus, if a photographer forgets to pull out the microphone, then noises of a video deck or the camera may be recorded by way of the microphone while the microphone is held at its retracted position.

Such a conventional video camera is further designed such that a changing over operation relating to picture recording such as an operation to open or close a lens barrier normally provided for protection of a lens of the camera is carried out independently of a shiting operation for shifting a microphone between a retracted inoperative position and a projected or advanced operative position. In the case of the video camera, a photographer is similarly liable to forget to shift the microphone from the retracted to the projected or advanced position or vice versa. If recording is made with the microphone left at the retracted position during photographing, then noises of a video deck or the camera will be recorded by way of the microphone.

SUMMARY OF THE INVENTION

It is an object of the present invention to provide a video camera wherein a microphone is shifted from a retracted inoperative position to a projected operative position without fail when the video camera is changed over from a photographing enabled condition to a photographing disabled condition or vice versa.

It is another object of the present invention to provide a video camera wherein noises are prevented from being recorded by way of a microphone after the microphone is shifted from a projected operative position to a retracted inoperative position.

In order to attain the objects, according to one aspect of the present invention, there is provided a video camera which comprises a video camera device, a switch for changing over the video camera device between a photographing enabled condition and a photographing disabled condition, a microphone mounted on the video camera device for movement between an inoperative position in which the microphone is accommodated in or closely contacted with the video camera device and an operative position in which the microphone is projected from the video camera device, and means for moving the microphone from the inoperative position to the operative position in response to changing over of the video camera device from the photographing disabled condition to the photographing enabled condition by the switch.

With the video camera, only if the switch is operated to change over the video camera device from the photograhing disabled condition to the photographing enabled condition, the microphone is moved from the inoperative position to the operative position. Where the switch is a power supply switch, the microphone is moved from the inoperative position to the operative position in response to changing over of the switch from an off condition to an on condition. Accordingly, when the video camera is used for photographing, the microphone is always held at the operative position for sound recording.

Alternatively, where the switch is a switch for changing over the video camera device between a recording enabling mode corresponding to the photographing enabled condition and a reproduction enabling mode corresponding to the photographing disabled condition, the microphone is moved from the inoperative position to the operative position in response to operation of the switch to change over the video camera device from the reproduction enabling mode to the recording enabling mode. Accordingly, when the video camera is used for photographing while recording sounds by way of the microphone, the microphone is always held at the operative position.

According to another aspect of the present invention, there is provided a video camera which comprises a video camera body, a photographing lens mounted on the video camera body, a lens barrier mounted on the video camera body for movement between a protecting position in which the lens barrier covers in front of the photographing lens and a photographing enabling position retracted from the position in front of the lens, a microphone mounted on the video camera for movement between an inoperative position in which the microphone is accommodated in or closely contacted with the video camera body and an operative position in which the microphone is projected from the video camera body, and means for moving the lens barrier from the protecting position to the photographing enabling position in response to movement of the microphone from the inoperative position to the operative position.

With the video camera, only if the microphone is operated to move from the inoperative position to the operative position, the lens barrier is moved from the protecting position to the photographing enabling position so that the video camera can thereafter photograph by way of the photographing lens. Accordingly, if the microphone is not moved to the operative position when photographing is to be effected with the video camera, then the lens barrier remains at the protecting position in which it covers in front of the photographing lens, which will be readily recognized by the photographer. The photographer will thus move the microphone to the operative position without fail.

Where the video camera additionally comprises a switch which changes over the video camera from a photographing disabled condition to a photographing enabled condition in response to movement of the microphone from the inoperative position to the operative position, the video camera cannot be used for photographing until after the microphone is moved to the operative position. Accordingly, noises are not recorded by way of the microphone when the microphone remains at the inoperative position.

According to a further aspect of the present invention, there is provided a video camera which comprises a video camera body, a photographing lens mounted on the video camera body, a lens barrier mounted on the video camera body for movement between a protecting position in which the lens barrier covers in front of the photographing lens and a photogrpahing enabling position retracted from the position in front of the lens, a microphone mounted on the video camera for movement between an inoperative position in which the microphone is accommodated in or closely contacted with the video camera body and an operative position in which the microphone is projected from the video camera body, and means for moving the microphone from the inoperative position to the operative position in response to mvement of the lens barrier from the protecting position to the photographing enabling position.

With the video camera, only if the lens barrier is operated to move from the protecting position to the photographing enabling position, the microphone is moved from the inoperative position to the operative position so that the video camera can record sounds by way of the microphone. Accordingly, when photographing is to be effected using the video camera, the video camera will not record noises by way of the microphone because the microphone does not remain at the inoperative position.

Where the video camera additionally comprises a switch which changes over the video camera from a photographing disabled condition to a photographing enabled condition in respose to movement of the lens barrier from the protecting position to the photographing enabling position, the video camera cannot be used for photographing until after the lens barrier is moved to the photographing enabling position. Accordingly, noises are not recorded by way of the microphone when the microphone remains at the inoperative position.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
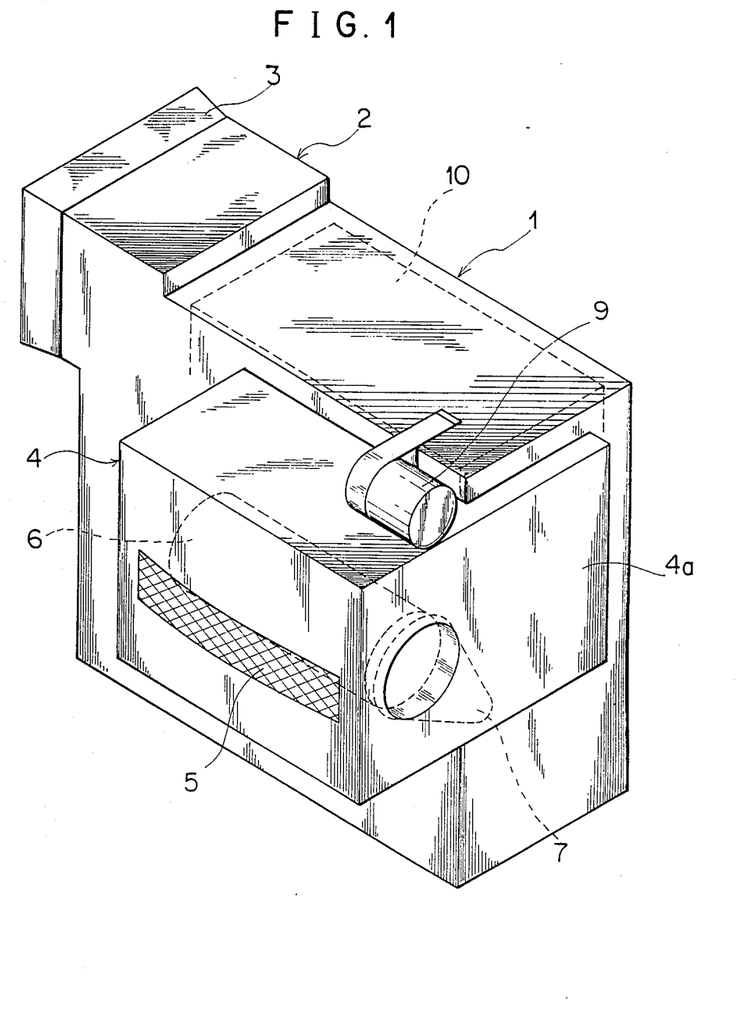
FIG. 1 is a perspective view of a video camera to which the present invention is applied.

Referring first to FIG. 1, there is shown a movie type video camera to which the present invention is applied. It is to be noted that the video camera shown has a generally similar configuration to the conventional video camera shown in FIG. 5 and like parts are denoted by like reference symbols to those of FIG. 5. The video camera shown in FIG. 1 is generally composed of a body section 1, a viewfinder section 2 and a grip section 4. A video deck 10 is disposed in the inside of the body section 1, and a microphone 9 is disposed on a top wall of the body section 1. An eye cup 3 is mounted on the viewfinder section 2. A lens component 6 is disposed in the inside of the grip section 4, and a hand strap 5 is provided on a side wall of the grip section 4 while a lens barrier 7 is located on a front wall 4a of the grip section 4.

Figures 2A, 2B, 2C, 2D:
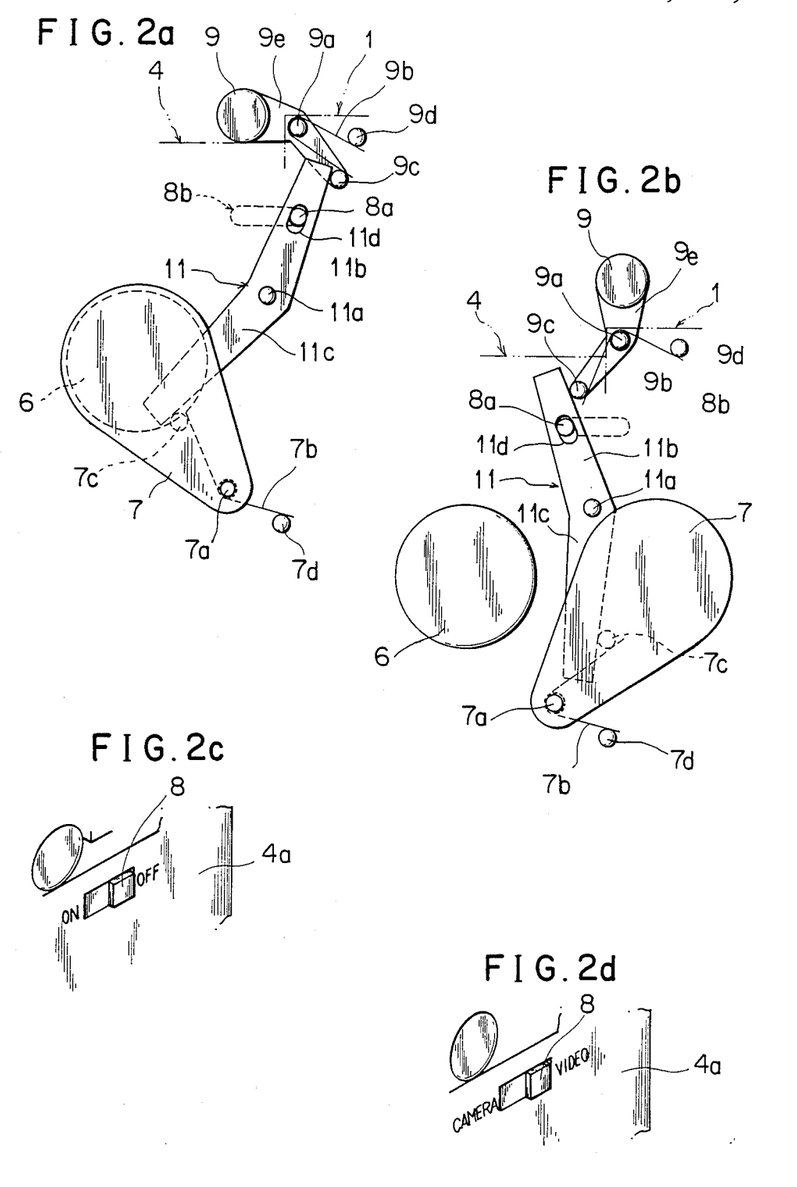
FIGS. 2a and 2b are front elevational views of an interlocking mechanism among a switch operating element, a microphone and a lens barrier in different positions showing a first embodiment of the present invention.
FIGS. 2c and 2d are perspective views showing different switches for use with the switch operating element of FIGS. 2a and 2b.

Though not shown in FIG. 1., a switch 8 such as a power supply switch in the form of a slide switch shown in FIG. 2c is also located on the front wall 4a of the grip section 4 of the video camera. The switch 8, lens barrier 7 and microphone 9 are operatively connected to each other by an interlocking mechanism which will be hereinafter described in detail. In particular, when the power supply switch 8 assumes its off position or photographing disabling position, the lens barrier 7 is positioned at a protecting position at which it covers in front of the lens 6 to protect the latter, but when the power supply switch 8 is manually moved to its on position or photographing enabling position, the lens barrier 7 is moved from the protecting position to a photographing enabling position at which it is retracted laterally from the position in front of the lens 6 and hence the video camera can photograph by way of the lens 7. On the other hand, when the power supply switch 8 assumes the off position, the microphone 9 is positioned at a retracted inoperative position at which it contacts closely with a top wall of the grip section 4, but when the power supply switch 8 is manually moved from the off position to the on position, the microphone 9 is moved from the inoperative position to an upwardly projected operative position at which it is a little spaced upwardly from the top wall of the body section 1 and accordingly it picks up less noises and is suitable for use for sound recording.

Referring now to FIGS. 2a and 2b, the interlocking mechanism among the power supply switch 8, lens barrier 7 and microphone 9 is shown in front elevation wherein FIG. 2a shows the interlocking mechanism when the power supply switch 9 assumes the off position while FIG. 2b shows the interlocking mechanism when the power supply switch 8 assumes the on position.

The power supply switch 8 shown in FIG. 2c has a switch operating element 8a in the form of a pin connected thereto as shown in FIGS. 2a ans 2b. The switch operating pin 8a is fitted in a switch guideway 8b formed in the front wall of the grip section 4 so that it may be moved within the range of the switch guideway 8b by manual operation of the switch 8. When the pin 8a is positioned at the right or left limit position in the switch guideway 8b as seen in FIG. 2a or 2b, the power supply switch 8 assumes its off or on condition, respectively. The pin 8a is also fitted in an elliptic guideway 11d formed in an interlocking lever 11 which is supported for pivotal motion around a fixed shaft 11a. Accordingly, as the power supply switch 8 is manually operated, the interlocking lever 11 is pivoted in either direction around the shaft 11a by way of the pin 8a.

The microphone 9 is supported on a microphone supporting lever 9e which is supported for pivotal motion around a fixed shaft 9a. The microphone supporting lever 9e is operatively associated with the power supply switch 8 such that when the power supply switch 8 assumes the off position, the microphone supporting lever 9e assumes a horizontal position in which the microphone 9 thereon lies on and closely contacts with the top wall the grip section 4 as seen in FIG. 2a, but when the power supply switch 8 is moved to the on position, the microphone supporting lever 9e is pivoted in the clockwise direction to such a position as shown in FIG. 2b wherein it stands uprightly on the top wall of the body section 1 and the microphone 9 thereon is positioned at the operative position spaced upwardly from the top wall of the body section 1.

In particular, the microphone supporting lever 9e is normally urged in the clockwise direction around the shaft 9a by means of a torsion coil spring 9b which has a central coiled portion fitted around the shaft 9a and has a pair of opposite ends engaged with a fixed pin 9d and another pin 9c secured to an end of the microphone supporting lever 9e remote from the microphone 9. The pin 9c on the microphone supporting lever 9e is normally held in engagement with an end portion of an arm 11b of the interlocking lever 11 under the urging force of the torsion coil spring 9b so that, as the interlocking lever 11 is pivoted in either direction, the microphone supporting lever 9e is pivoted in an interlocking relationship therewith.

The lens barriers 7 is supported for pivotal motion around a fixed shaft 7a and operatively associated with the power supply switch 8 such that, when the power supply switch 8 assumes the off postion, it is positioned at the protecting position in which it covers in front of the lens 6 as seen in FIG. 2a, but when the power supply switch 8 is moved from the off position to the on position, it is pivoted in the clockwise direction from the protecting position to the photographing enabling position as seen in FIG. 2b.

In particular, the lens barrier 7 is normally urged in the counterclockwise direction by means of a torsion coil spring 7b which has a central coiled portion fitted around the shaft 7a and has a pair of opposite ends engaged with a fixed pin 7d and another pin 7c secured to a mid portion of the lens barrier 7. The pin 7c on the lens barrier 7 is normally held in engagement with an end portion of another arm 11c of the interlocking lever 11 under the urging force of the torsion coil spring 7b so that, as the interlocking lever 11 is pivoted in either direction, the lens barrier 7 is pivoted in an interlocking relationship therewith.

Subsequently, interlocking movement of the power supply switch 8, microphone 9 and lens barrier 7 when the power supply switch 8 is moved between the off position shown in FIG. 2a and the on position shown in FIG. 2b will be described. In particular, if the power supply switch 8 is moved from the off position to the on position by manual operation thereof, the interlocking lever 11 is pivoted in the counterclockwise direction around the shaft 11a by way of the pin 8a of the switch 8 fitted in the guideway 11d of the lever 11. Thereupon, as the pin 9c on the microphone supporting lever 9e follows the arm 11b of the interlocking lever 11 under the urging force of the torsion coil spring 9b, the microphone supporting lever 9e is pivoted in the clockwise direction around the shaft 9a by the torsion coil spring 9b to shift the microphone 9 from the retracted inoperative position shown in FIG. 2a to the upwardly projected operative position shown in FIG. 2b.

Meanwhile, when the interlocking lever 11 is pivoted in the counterclockwise direction, the pin 7c on the lens barrier 7 is pushed by the other arm 11c of the interlocking lever 11 so that the lens barrier 7 is pivoted in the clockwise direction from the protecting position to the photographing enabling position around the shaft 7a against the biasing force of the torsion coil spring 7b.

Though not shown, a click stop mechanism is provided in the power supply switch 8 as in a conventional slide switch. The click stop mechanism is designed so as to defeat a difference between a moment around the shaft 11a of the interlocking lever 11 exerted by the torsion coil spring 9b by way of the pin 9c on the microphone supporting lever 9e and another moment around the shaft 11a exerted by the torsion coil spring 7b by way of the pin 7c on the lens barrier 7 in order to stably retain the power supply switch 8 to the on position and the associated members to the individual positions shown in FIG. 2b.

On the contrary, when the power supply switch 8 is manually moved from the on position to the off position, the interlocking lever 11, microphone 9 and lens barrier 7 are pivoted in the individually reverse directions so that the microphone 9 is shifted from the operative position to the inoperative position and the lens barrier 7 is moved from the photographing enabling position to the protecting position. In this instance, the microphone supporting lever 9e is pivoted in the counterclockwise direction against the urging force of the torsion coil spring 9b by the interlocking lever 11 while the lens barrier 7 is pivoted also in the counterclockwise direction by the urging force of the torsion coil spring 7b as the pin 7c on the lens barrier 7 follows the interlocking lever 11. At the off position of the power supply switch 8 shown in FIG. 2a, similar moments act upon the interlocking lever 11 around the shaft 11a, but the aforementioned click stop mechanism in the power supply switch 8 defeats a difference between the moments so that the power supply switch 8 is retained stably to the off position and the interlocking lever 11, microphone 9 and lens barrier 7 are retained stably to the individual positions shown in FIG. 2a.

In summary, the microphone is shifted from the retracted inoperative position to the upwardly projected operative position and the lens barrier is moved from the protecting position to the photographing enabling position in an interlocking relationship with a movement of the power supply switch from the off position to the on position. To the contrary, in an interlocking relationship with a reverse movement of the power supply switch from the on position to the off position, the microphone is shifted from the operative position to the inoperative position and the lens barrier is simultaneously moved from the photographing enabling position to the protecting position.

It is to be noted that while in the embodiment described above the mechanism for shifting the microphone is composed only of mechanical parts, the mechanism may otherwise include an electric part such as an electromagnet. For example, the pin 8a may be formed as a separate member from the power supply switch 8 and operatively associated with an electromagnet and a return spring or a pair of electromagnets such that it may be moved alternatively by the electromagnet which is energized when the power supply switch 8 is operated. Further, the interlocking lever 11 may be replaced by two electromagnets and two respective return springs or two pairs of electromagnets which are arranged to directly move the pins 7c and 9c on the lens barrier 7 and the microphone supporting lever 9e, respectively. In addition, while the switch 8 is described as a slide switch which is mechanically coupled to the interlocking lever 11, it may be a switch of any other type which may not be mechanically coupled to the interlocking lever 11, and where a switch of a different type is employed, it is preferable to employ one or more electromagnets for actuation of the interlocking lever 11 or the lens barrier 7 and the microphone supporting lever 9e as described just above.

While the switch 8 coupled to the interlocking lever 11 is described as a power supply switch in the description of the video camera of the first embodiment, alternatively it may be a mode switch for changing over the video camera between a camera mode in which the video camera can photograph or record picture images and a video mode in which recorded picture images can be reproduced on the video camera or a video tape can be fed fast or rewound in the video camera. Such a mode switch or video/camera changing over switch 8 is illustratively shown in FIG. 2d.

Referring to FIGS. 2a, 2b and 2d, the mode switch 8 is supported for movement in the switch guideway 8b between a video mode position coincident with the right limit position of the pin 8a in the switch guideway 8b as shown in FIG. 2a and a camera mode position coincident with the left limit position of the pin 8a as shown in FIG. 2b. Accordingly, when the video camera is in the video mode, the interlocking member 11, microphone 9 and lens barrier 7 assume the individual positions shown in FIG. 2a, but when the video camera is in the camera mode, those members assume the individual positions shown in FIG. 2b.

With the modified video camera shown in FIGS. 2a, 2b and 2d, the microphone is shifted from the retracted inoperative position to the upwardly projected operative position and the lens barrier is moved from the protecting position to the photographing enabling position in an interlocking relationship with a movement of the mode switch from the video mode position to the camera mode position. To the contrary, in an interlocking relationship with a reverse movement of the mode switch from the camera mode position to the video mode position, the microphone is shifted from the operative position to the inoperative position and the lens barrier is moved from the photographing enabling position to the protecting position.

It is to be noted that while in the modification described just above the video/camera changing over switch is used as a switch for changing over the video camera between the recording enabling condition and the reproduction enabling condition, it may be replaced by a recording switch and a stopping switch which is used to stop recording of the video camera so as to permit the video camera to be thereafter put into a reproducing condition and so on.

Further, in order to permit the microphone shifting mechanism to remain inoperative when a mode in which recording of pictures is made without using the microphone is selected for after recording or the like, the mode switch 8 and the pin 8a may be formed as separate members.

Figures 3A, 3B:
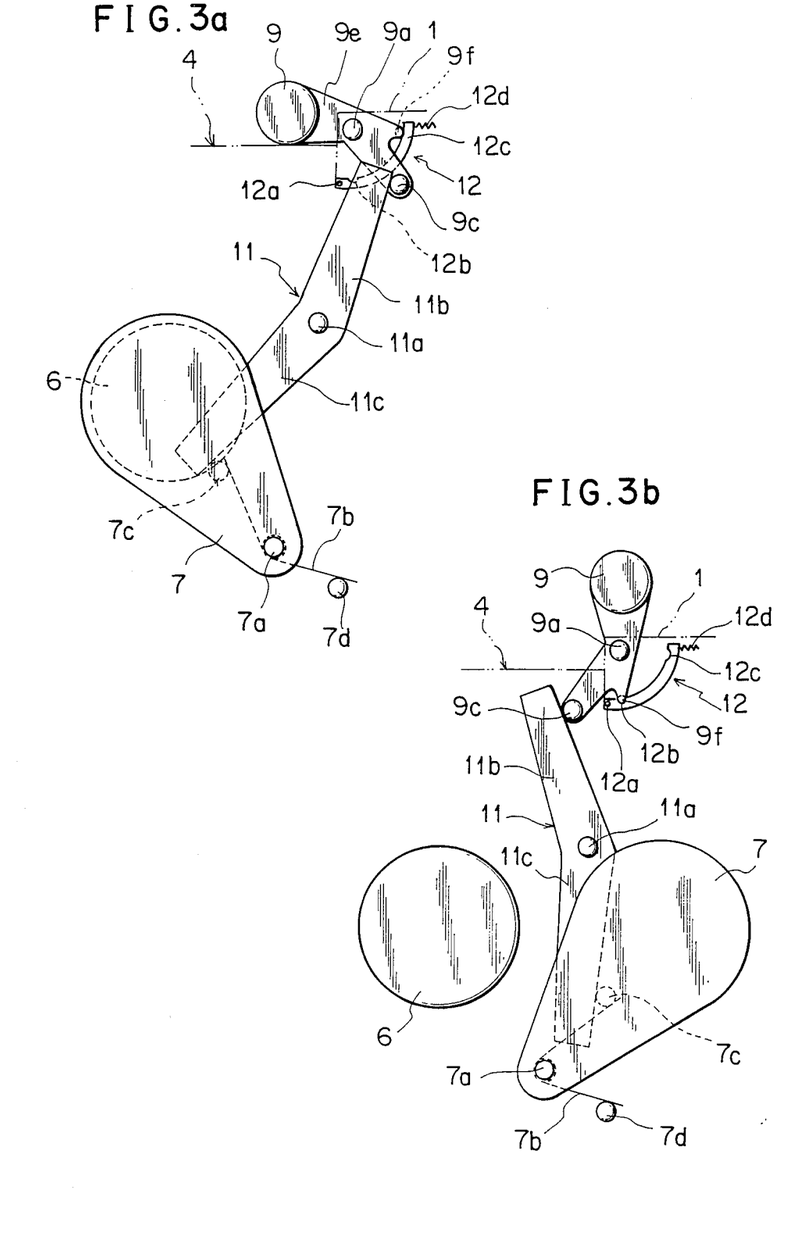
FIGS. 3a and 3b are front elevational views of an interlocking mechanism between a microphone and a lens barrier in different positions showing a second embodiment of the present invention.

Referring now to FIGS. 3a and 3b, there is shown an interlocking mechanism of a video tape recorder according to a second embodiment of the present invention. The interlocking mechanism shown has a generally similar construction to the interlocking mechanism described hereinabove with reference to FIGS. 2a and 2b. Accordingly, like parts or elements are denoted by like reference symbols to those of FIGS. 2a and 2b, and overlapping description thereof is omitted herein to avoid redundancy. This also applies to an interlocking mechanism of a video tape recorder according to a third embodiment of the present invention shown in FIGS. 4a and 4b.

The interlocking mechanism shown in FIGS. 3a and 3b is designed such that a lens barrier is pivoted in an interlocking relationship by manual shifting motion of a microphone or manual pivotal motion of a microphone suppporting lever. The interlocking mechanism is thus different from the interlocking mechanism shown in FIGS. 2a to 2c or FIGS. 2a, 2b and 2d principally in that it is not associated with a switch such as the switch 8 and a microphone supporting lever is not urged by such a spring as the torsion coil spring 9b while a click stop mechanism is provided for retaining a microphone alternatively to an inoperative position or an operative position. In particular, an interlocking lever 11 and a lens barrier 7 have similar constructions and a similar mutually interlocking relationship to the interlocking lever 11 and the lens barrier 7 shown in FIGS. 2a and 2b except that the interlocking lever 11 shown in FIGS. 3a and 3b has no such a guideway as the guideway 11d formed therein. To the contrary, a microphone supporting lever 9e having a microphone 9 supported at an end thereof is modified in configuration in that a pin 9f is provided at an end of a projection provided at an intermediate portion thereof.

It is to be noted that while the microphone supporting lever 9e is not acted upon by such a spring as the torsion coil spring 9b of FIGS. 2a and 2b, a pin 9c at the other end of the microphone supporting lever 9e remote from the microphone 9 is normally held in contact with an end portion of an arm 11b of the interlocking lever 11 under the urging force of a torsion coil spring 7b imparted to the interlocking lever 11 by way of the lens barrier 7 and a pin 7c on the lens barrier 7 so that the microphone supporting lever 9e is normally urged in the couterclockwise direction around a fixed shaft 9a.

The microphone supporting lever 9e is designed so as to cooperate with a click stop mechanism for stably retaining the microphone 9 alternatively to its retracted inoperative position or to its upwardly projected operative position. The click stop mechanism includes an arcuate retaining member 12 having a pair of recesses 12b and 12c formed along an inner edge thereof for fitting with the pin 9f on the microphone supporting lever 9e. The retaining member 12 is supported for pivotal motion around a fixed shaft 12a and normally urged in the couterclockwise direction by means of a compression coil spring 12d. Accordingly, if the pin 9f on the microphone supporting lever 9e is fitted into the recess 12b or 12c of the retaining member 12, it is thereafter held fitted in the recess 12b or 12c against the urging force of the torsion coil spring 7b acting in the counterclockwise direction upon the microphone supporting lever 9e at the pin 9c.

When the microphone 9 assumes its retracted inoperative position as shown in FIG. 3a, the pin 9f on the microphone supporting lever 9e is fitted in the recess 12c of the retaining member 12. In this instance, the microphone 9 substantially closely contacts with the top wall of the grip section 4 (FIG. 1) and is retained to the position by the click stop mechanism.

To the contrary, when the microphone 9 assumes its upwardly projected inoperative position as shown in FIG. 3b, the pin 9f is fitted in the other recess 12b of the retaiing member 12. In this instance, the microphone 9 is positioned a little above the top wall of the body section 1 (FIG. 1) and is retained to the position by the click stop mechanism.

Thus, the position of the microphone 9 depends upon whether the pin 9f on the microphone supporting lever 9e is fitted in the recess 12c or 12b of the retaining member 12. Further, since the interlocking lever 11 is associated with the microphone supporting lever 12e by way of the pin 9c on the latter, the positions of the interlocking lever 11 and the lens barrier 7 depend upon the position of the pin 9f.

Subsequently, interlocking movement of the microphone 9 and the lens barrier 7 when the interlocking mechanism is changed from the condition shown in FIG. 3a wherein the microphone 9 is in the retracted inoperative position to the condition shown in FIG. 3b wherein the microphone 9 is in the upwardly projected operative position will be described. When the microphone 9 is to be used, the microphone supporting lever 9e which is retained at such a position as shown in FIG. 3a with the pin 9f thereon fitted in the recess 12c of the retaining member 12 is pivoted upwardly in the clockwise direction by manual operation thereof. Thereupon, the pin 9f is moved out of the recess 12c and slides on the inner periphery of the retaining member 12 toward the other recess 12b. When the microphone supporting lever 9e is pivoted in the clockwise direction, the other pin 9c thereon pushes the arm 11b of the interlocking lever 11 to pivot the interlocking lever 11 in the counterclockwise direction around a fixed shaft 11a. Upon such counterclockwise pivotal motion of the interlocking lever 11, the other arm 11c thereof pushes the pin 7c on the lens barrier 7 to pivot the lens barrier 7 in the clockwise direction around a fixed shaft 7a from the protecting position in which it covers in front of a lens 6.

When the microphone supporting lever 9e is pivoted to move the microphone 9 to such an upwardly projected operative position as shown in FIG. 3b, the pin 9f thereon is fitted into the other recess 12b of the retaining member 12. Consequently, the pin 9f is thereafter held fitted in the recess 12b. Accordingly, also the lens barrier 7 is thereafter held to the photographing enabling position retracted from the position in front of the lens 6 as shown in FIG. 3b.

In this manner, the lens barrier 7 is changed over from the protecting position to the photographing enabling position in an interlocking relationship to a shifting motion of the microphone 9 from the retracted inoperative position to the upwardly projected operative position.

To the contrary, when the microphone 9 is changed over from the upwardly projected operative position shown in FIG. 3b to the retracted inoperative position shown in FIG. 3a, the microphone 9, interlocking lever 11 and lens barrier 7 are moved individually in the reverse directions until the pin 9f on the microphone supporting lever 9e is fitted into the recess 12c of the retaining member 12. Accordingly, the microphone 9 is thereafter retained to the retracted position and also the lens barrier 7 is thereafter retained to the protecting position by way of the interlocking lever 11.

In this manner, the lens barrier 7 is changed over from the photographing enabling position to the protecting position in an interlocking relationship to a shifting motion of the microphone 9 from the upwardly projected operative position to the retracted inoperative position.

While the video camera of the second embodiment described above includes no such switch as the switch 8 of the video camera of the first embodiment described above, it may additionally include a switch such as a power supply switch or a mode switch or video/camera changing over switch associated with the interlocking mechanism such that, in response to a shifting motion of the microphone 9 between the retracted inoperative position and the upwardly projected operative position, the video camera may be changed over between a photographing enabled condition and a photographing disabled condition or between a recording enabling condition and a reproduction enabling condition. Such a switch as shown in FIGS. 2a to 2c or FIGS. 2a, 2b and 2d may be employed as the additional switch, and where such a switch is employed, the switch is changed over by manual operation of the microphone 9 by way of the interlocking mechanism. Otherwise, the additional switch may be electrically or mechanically coupled to the microphone supporting lever 9e or the lens barrier 7. Further, the additional switch may be of any type other than the slide type.

Figure 4A:
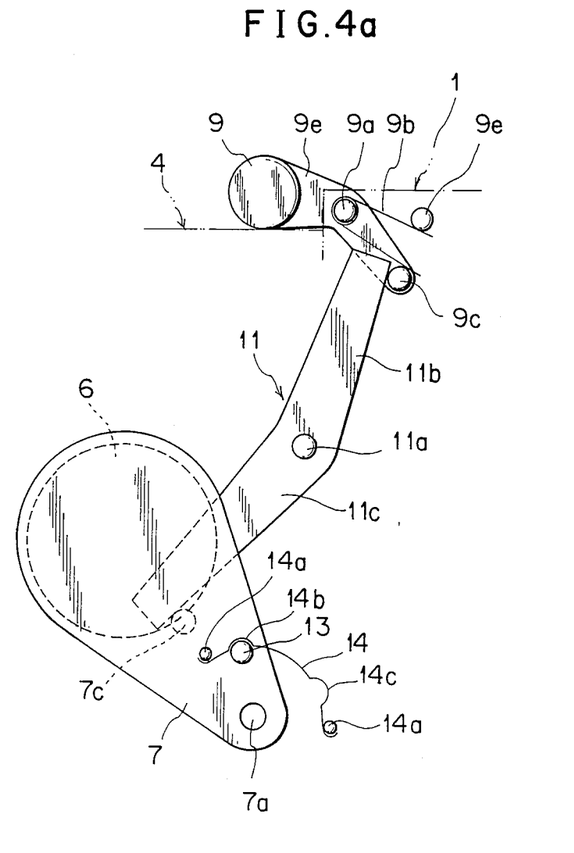
FIGS. 4a and 4b are views similar to FIGS. 3a and 3b, respectively, but showing a third embodiment of the present invention.
Figure 4B:
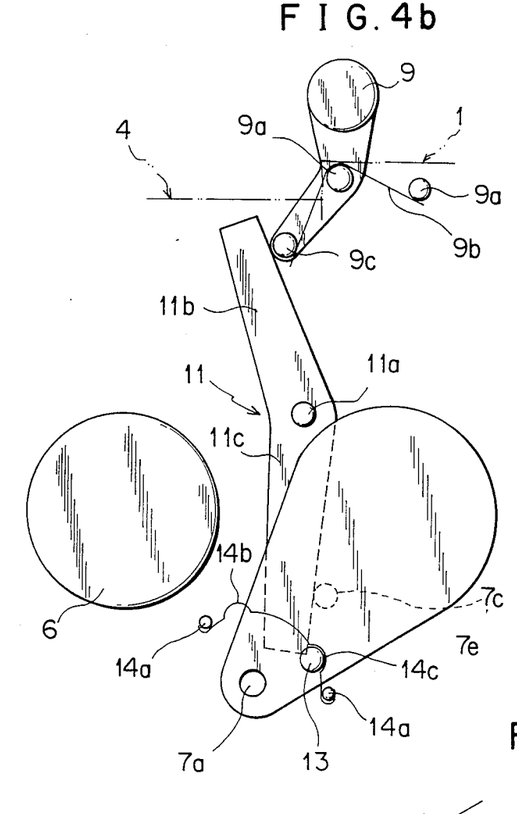

Referring now to FIGS. 4a and 4b, there is shown an interlocking mechanism of a video tape recorder according to a third embodiment of the present invention. The interlocking mechanism shown has a generally similar construction to the interlocking mechanism described hereinabove with reference to FIGS. 2a and 2b, but is designed such that a microphone supporting lever is pivoted in an interlocking relationship by manual pivotal motion of a lens barrier. The interlocking mechanism is thus different from the interlocking mechanism shown in FIGS. 2a to 2c or FIGS. 2a, 2b and 2d principally in that it is not associated with a switch such as the switch 8 and a lens barrier is not urged by such a spring as the torsion coil spring 7b while a click stop mechanism is provided for retaining the lens barrier alternatively to a protecting position or a photographing enabling position.

Figure 4C:
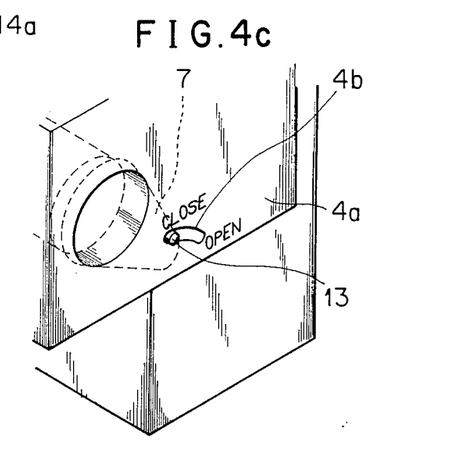
FIG. 4c is a partial perspective view showing a pin for operating a lens barrier.

In particular, an interlocking lever 11 and a microphone supporting lever 9e have similar constructions and a similar mutually interlocking relationship to the interlocking lever 11 and the microphone supporting lever 9e shown in FIGS. 2a and 2b except that the interlocking lever 11 shown in FIGS. 3a and 3b has no such a guideway as the guideway 11d formed therein. To the contrary, a lens barrier 7 is modified in configuration in that a pin 13 is provided at a location of the lens barrier 7 between a pin 7c and a fixed shaft 7a and extends outwardly through an arcuate hole 4b formed in the front wall 4a of the grip section 4 (FIG. 1) of the video camera as shown in FIG. 4c in order to allow manual operation of the lens barrier 7.

It is to be noted that while the lens barrier 7 is not acted upon by such a spring as the torsion coil spring 7b of FIGS. 2a and 2b, the pin 7c on the lens barrier 7 is normally held in contact with an end portion of an arm 11c of the interlocking lever 11 under the urging force of a torsion coil spring 9b imparted to the interlocking lever 11 by way of the microphone supporting lever 9e and a pin 9c on the microphone supporting lever 9e so that the lens barrier 7 is normally urged in the counterclockwise direction around the shaft 7a.

The microphone supporting lever 9e is designed so as to cooperate with a click stop mechanism for stably retaining the lens barrier 7 alternatively to its protecting position or to its photographing enabling position. The click stop mechanism includes an arcuate retaining member 14 in the form of a leaf spring or a spring wire. The retaining member 14 has a pair of recessed portions 14b and 14c formed thereon for fitting with the pin 13 on the lens barrier 7. The retaining member 14 is supported at the opposite ends thereof on a pair of fixed spring retaining pins 14a. Accordingly, if the pin 13 on the lens barrier 7 is fitted into the recessed portion 14b or 14c of the retaining member 14, it is thereafter held fitted in the recessed portion 14b or 14c against the urging force of the torsion coil spring 9b acting in the counterclockwise direction upon the lens barrier 7 at the pin 7c.

The position of the microphone 9 depends upon whether the pin 13 on the lens barrier 7 is fitted in the recessed portion 14c or 14b of the retaining member 14. In particular, when the pin 13 on the lens barrier 7 is fitted in the recessed portion 14c of the retaining member 14, the lens barrier 7 is retained to its protecting position and hence the microphone 9 is retained to its retracted inoperative position by way of the interlocking lever 11 as shown in FIG. 4a. To the contrary, when the pin 13 is fitted in the other recessed portion 14b, the lens barrier 9 is retained to its photographing enabling position and hence the microphone 9 is retained to its upwardly projected operative position as shown in FIG. 4b.

Subsequently, interlocking movement of the microphone 9 and the lens barrier 7 when the interlocking mechanism is changed from the condition shown in FIG. 4a wherein the microphone 9 is in the retracted inoperative position to the condition shown in FIG. 4b wherein the microphone 9 is in the upwardly projected operative position will be described. When photographing is to be effected by way of the lens 6, the pin 13 on the lens barrier 7 which is retained at such a position as shown in FIG. 4a with the pin 13 thereon fitted in the recessed portion 14b of the retaining member 14 is manually operated to pivot the lens barrier 7 in the clockwise direction around the shaft 7a against the retaining force of the resilient retaining member 14. Thereupon, the pin 13 is moved out of the recessed portion 14b and slides on the retaining member 14 toward the other recessed portion 14c. When the lens barrier 7 is pivoted in the clockwise direction, the interlocking lever 11 is pivoted in the counterclockwise direction around a fixed shaft 11a by the urging force of the torsion coil spring 9b as the arm 11c of the interlocking lever 11 follows the other pin 7c on the lens barrier 7. Upon such counterclockwise pivotal motion of the interlocking lever 11, the microphone supporting lever 9e is pivoted in the clockwise direction around a fixed shaft 9a by the urging force of the torsion coil spring 9b to move the microphone 9 thereon from the retracted inoperative position on the top wall of the grip portion 4 (FIG. 1) of the video camera as the pin 9c thereon follows the other arm 11b of the interlocking lever 11.

When the lens barrier 7 is pivoted to the photographing enabling position shown in FIG. 3b, the pin 13 thereon is fitted into the other recessed portion 14b of the retaining member 14. Thus, the pin 13 is thereafter held fitted in the recessed portion 14c. Consequently, also the microphone 9 on the microphone supporting lever 9e is thereafter held to the upwardly projected operative position by way of the interlocking mechanism.

In this manner, the microphone 9 is changed over from the retracted inoperative position to the upwardly projected operative position in an interlocking relationship to a pivotal motion of the lens barrier 7 from the protecting position to the photographing enabling position.

To the contrary, when the lens barrier 7 is changed over from the photographing enabling position shown in FIG. 4b to the protecting position shown in FIG. 4a, the microphone 9, interlocking lever 11 and lens barrier 7 are moved individually in the reverse directions until the pin 13 on the lens barrier 7 is fitted into the recessed portion 14b of the retaining member 14. Accordingly, the lens barrier 7 is thereafter retained to the protecting position and also the microphone 9 is thereafter retained to the retracted inoperative position by way of the interlocking lever 11.

In this manner, the microphone 9 is shifted from the upwardly projected operative position to the retracted inoperative position in an interlocking relationship to a pivotal motion of the lens barrier 7 9 from the photographing enabling position to the protecting position.

While the video camera of the third embodiment described above includes no such switch as the switch 8 of the video camera of the first embodiment described above, it may include an additional switch similar to the additional switch described hereinabove in connection with the video camera of the second embodiment shown in FIGS. 3a and 3b. In this instance, however, the switch is associated with the interlocking mechanism such that, in response to a pivotal motion of the lens barrier 7 between the protecting position and the photographing enabling position, the video camera may be changed over between a photographing enabled condition and a photographing disabled condition or between a recording enabling condition and a reproduction enabling condition.

It is to be noted that while in the first embodiment the microphone 9, lens barrier 7 and switch 8 are described retained at the individual predetermined positions by the click stop mechanism provided in the switch 8, a click stop mechanism similar to the click stop mechanism employed in the interlocking mechanism shown in FIGS. 3a and 3b or in FIGS. 4a and 4b may be provided either in place of or in addition to the click stop mechanism of the switch 8 for the interlocking mechanism shown in FIGS. 2a and 2b.

Having now fully described the invention, it will be apparent to one of ordinary skill in the art that many changes and modifications can be made thereto, without departing from the spirit and scope of the invention as set forth herein.

While the embodiments described above have the form of a movie type video camera, they may alternatively have the form of a still video camera.

What is claimed is:

1. A video camera, comprising a video camera device, a switch for changing over said video camera device between a photographing enabled condition and a photographing disabled condition, a microphone mounted on said video camera device for movement between an inoperative position in which said microphone is accommodated in or closely contacted with said video camera device and an operative position in which said microphone is projected from said video camera device, and means for moving said microphone from the inoperative position to the operative position in response to changing over of said video camera device from the photographing disabled condition to the photographing enabled condition by said switch.

2. A video camera as claimed in claim 1, wherein said switch is a power supply switch.

3. A video camera as claimed in claim 1, wherein said switch is a switch for changing over said video camera device between a recording enabling mode corresponding to the photographing enabled condition and a reproduction enabling mode corresponding to the photographing disabled condition.

4. A video camera as claimed in claim 1, further comprising a photographing lens, a lens barrier mounted for movement between a protecting position in which said lens barrier covers in front of said photographing lens and a photographing enabling position retracted from the position in front of said lens, and second means for moving said lens barrier from the protecting position to the photographing enabling position in response to changing over of said video camera device from the photographing disabled position to the photographing enabled position by said switch.

5. A video camera, comprising a video camera body, a photographing lens mounted on said video camera body, a lens barrier mounted on said video camera body for movement between a protecting position in which said lens barrier covers in front of said photographing lens and a photographing enabling position retracted from the position in front of said lens, a microphone mounted on said video camera for movement between an inoperative position in which said microphone is accommodated in or closely contacted with said video camera body and an operative position in which said microphone is projected from said video camera body, and means for moving said lens barrier from the protecting position to the photographing enabling position in response to movement of said microphone from the inoperative position to the operative position.

6. A video camera as claimed in claim 5, further comprising a switch for changing over said video camera between a photographing enabled condition and a photographing disabled condition, and means for operating said switch to change over said video camera from the photographing disabled condition to the photographing enabled condition in response to movement of said microphone from the inoperative position to the operative position.

7. A video camera as claimed in claim 5, further comprising a switch for changing over said video camera between a photographing enabled condition and a photographing disabled condition, and means for operating said switch to change over said video camera from the photographing disabled condition to the photographing enabled condition in response to movement of said lens barrier from the protecting position to the photographing enabling position.

8. A video camera, comprising a video camera body, a photographing lens mounted on said video camera body, a lens barrier mounted on said video camera body for movement between a protecting position in which said lens barrier covers in front of said photographing lens and a photographing enabling position retracted from the position in front of said lens, a microphone mounted on said video camera for movement between an inoperative position in which said microphone is accommodated in or closely contacted with said video camera body and an operative position in which said microphone is projected from said video camera body, and means for moving said microphone from the inoperative position to the operative position in response to movement of said lens barrier from the protecting position to the photographing enabling position.

* * * * *